United States Patent
Garnier et al.

(10) Patent No.: US 6,984,803 B1
(45) Date of Patent: Jan. 10, 2006

(54) LOW PROFILE LASER ASSEMBLY

(75) Inventors: Steven F. Garnier, Littleton, CO (US); Chad A. Mitchiner, Golden, CO (US); Jay A. Moore, Broomfield, CO (US)

(73) Assignee: Epilog Corporation, Golden, CO (US)

( * ) Notice: Subject to any disclaimer, the term of this patent is extended or adjusted under 35 U.S.C. 154(b) by 0 days.

(21) Appl. No.: 10/711,307

(22) Filed: Sep. 9, 2004

(51) Int. Cl.
B23K 26/14 (2006.01)

(52) U.S. Cl. .......................... 219/121.82; 219/121.67; 219/121.68; 219/121.72

(58) Field of Classification Search .......... 219/121.78, 219/121.79, 121.82, 121.84, 121.67, 121.68, 219/121.69, 121.72; 108/50.13
See application file for complete search history.

(56) References Cited

U.S. PATENT DOCUMENTS

| | | |
|---|---|---|
| 4,507,789 A | 3/1985 | Daly |
| 4,970,600 A | 11/1990 | Garnier |
| 4,985,780 A | 1/1991 | Garnier |
| 5,051,558 A | 9/1991 | Sukhman |
| 5,362,941 A | 11/1994 | Johnson |
| 5,394,427 A | 2/1995 | McMinn |
| 5,453,594 A | 9/1995 | Konecny |
| 5,589,089 A | 12/1996 | Uesugi |
| 5,661,746 A | 8/1997 | Sukhman |
| 5,754,575 A | 5/1998 | Sukhman |
| 5,837,962 A | 11/1998 | Overbeck |
| 5,894,493 A | 4/1999 | Sukhman |
| 5,901,167 A | 5/1999 | Sukhman |
| 5,904,867 A | 5/1999 | Herke |
| 5,906,760 A | 5/1999 | Robb |
| 5,916,461 A | 6/1999 | Costin |
| 5,980,088 A | 11/1999 | Iwasaki |
| 5,982,803 A | 11/1999 | Sukhman |
| 5,990,444 A | 11/1999 | Costin |
| 6,002,099 A | 12/1999 | Martin |
| 6,064,034 A | 5/2000 | Rieck |
| 6,066,829 A | 5/2000 | Ishikawa |
| 6,085,122 A | 7/2000 | Manning |
| 6,144,011 A | 11/2000 | Moss |

(Continued)

FOREIGN PATENT DOCUMENTS

DE 29916400 U1 * 12/1999

(Continued)

*Primary Examiner*—Geoffrey S. Evans
(74) *Attorney, Agent, or Firm*—Swanson & Bratschun LLC

(57) ABSTRACT

A laser assembly includes a removable work table defining a planar work surface. A frame is configured for supporting the removable work table with the work surface in a work surface plane. An X-Y beam transport is operatively associated with the frame and is configured to direct a laser beam from a laser beam source to X-Y coordinates relative to the frame. At least one clamp is operatively associated between the frame and the removable work table with each clamp having a clamping position for clamping the work table to the frame with the work surface in the work surface plane in a release position or removing the work table from the frame. A void underlies the removable work table and is operatively associated with the X-Y beam transport with the removable work surface removed. A X axis control member moves the work table along a Z axis normal to the work surface plane between a proximal position near the X-Y beam transport and a distal position away from the X-Y beam transport. A redirectable exhaust having an exhaust inlet is operatively associated with the work table for transitioning exhaust above and below the work surface as the work table is moved from the distal position to the proximal position along the Z axis.

30 Claims, 13 Drawing Sheets

U.S. PATENT DOCUMENTS

| | | |
|---|---|---|
| 6,150,629 A | 11/2000 | Sievers |
| 6,160,835 A | 12/2000 | Kwon |
| 6,172,328 B1 | 1/2001 | Jones |
| 6,180,913 B1 | 1/2001 | Kolmeder |
| 6,180,914 B1 | 1/2001 | Jones |
| 6,252,196 B1 | 6/2001 | Costin |
| 6,262,388 B1 | 7/2001 | Canella |
| 6,331,691 B1 | 12/2001 | DePrisco |
| 6,342,687 B1 | 1/2002 | Sukhman |
| 6,346,687 B1 | 2/2002 | Kinoshita |
| 6,362,451 B1 | 3/2002 | Karni |
| 6,388,228 B1 | 5/2002 | Lai |
| 6,420,679 B1 | 7/2002 | Mierczynski |
| 6,424,670 B1 | 7/2002 | Sukhman |
| 6,455,806 B1 | 9/2002 | Jendick |
| 6,465,756 B2 | 10/2002 | Tanaka |
| 6,483,071 B1 | 11/2002 | Hunter |
| 6,495,791 B2 | 12/2002 | Hunter |
| 6,518,540 B1 | 2/2003 | Wee |
| 6,552,300 B1 | 4/2003 | Kerner |
| 6,586,702 B2 | 7/2003 | Wiener-Avnear |
| 6,600,128 B2 | 7/2003 | Lai |
| 6,649,861 B2 | 11/2003 | Duignan |
| 6,662,063 B2 | 12/2003 | Hunter |
| 6,685,868 B2 | 2/2004 | Costin |
| 6,700,094 B1 | 3/2004 | Kuntze |
| 6,881,924 B2 * | 4/2005 | Lai ................ 219/121.67 |
| 2001/0023858 A1 | 9/2001 | Moss |
| 2001/0027965 A1 | 10/2001 | McCay |
| 2001/0032831 A1 | 10/2001 | Benderly |
| 2001/0052512 A1 | 12/2001 | Hunter |
| 2002/0004687 A1 | 1/2002 | Hunter |
| 2002/0038794 A1 | 4/2002 | Canella |
| 2002/0077720 A1 | 6/2002 | Kafka |
| 2002/0096502 A1 | 7/2002 | Mierczynski |
| 2002/0117486 A1 | 8/2002 | Christensen |
| 2002/0125231 A1 | 9/2002 | Hunter |
| 2002/0126727 A1 | 9/2002 | Sukhman |
| 2002/0134769 A1 | 9/2002 | Teoman |
| 2002/0170893 A1 | 11/2002 | Rohleder |
| 2002/0179580 A1 | 12/2002 | Costin |
| 2002/0198622 A1 | 12/2002 | Dinauer |
| 2003/0058917 A1 | 3/2003 | Benderly |
| 2003/0106880 A1 | 6/2003 | Lai |
| 2003/0149507 A1 | 8/2003 | Pierozzi |
| 2003/0178395 A1 | 9/2003 | Duignan |
| 2004/0040943 A1 | 3/2004 | Lundberg |

FOREIGN PATENT DOCUMENTS

| | | | |
|---|---|---|---|
| JP | 1-224196 | | 7/1989 |
| JP | 2003-136248 A | * | 5/2003 |
| WO | WO 97/15101 | | 4/1997 |

* cited by examiner

LOW PROFILE LASER ASSEMBLY

FIELD OF THE INVENTION

The present invention is directed toward laser cutting/engraving assemblies, and more particularly toward a low profile laser cutting/engraving assembly having an automatically redirected exhaust path.

BACKGROUND OF THE INVENTION

Laser cutting/engraving assemblies are well known in the art. Exemplary devices are disclosed in Garnier, U.S. Pat. No. 4,985,780 and Lundberg, U.S. Patent Application Publication No. U.S. 2004/0040943 A1, the disclosures of which are incorporated by reference in their entirety herein. Currently available commercial laser cutting/engraving apparatus include the Epilog Legend 24TT, 24EX and 32EX. While these Epilog Legend models provide extremely high quality and cost effective cutting and engraving of work pieces, these machines are rather large in size and not readily portable. This not only renders them inconvenient for some users, but the overall size increases the costs of materials and transport of the devices, increasing consumer cost.

During the cutting and engraving processes, fumes and debris are released from the work piece and must be exhausted from the work piece in order to maximize the quality of the engraving or cutting. Lai, U.S. Pat. No. 6,388,228, discloses a laser engraving machine including a sculpturing platform that can be raised or lowered to accommodate work pieces of varying thickness. Lai further discloses an exhaust system including a rotating valve controlling lever that allows a user to exhaust air above, below or simultaneously above and below the sculpturing platform. The manual control of the exhaust requires an operator to remember to switch ventilation to below the sculpturing platform when a thin work piece is being cut using the Lai device. Failure to provide exhaust below the sculpturing platform can cause smoke and/or debris to linger in the vicinity of a laser cut and cause discoloration or marring of the work piece.

The present invention is intended to overcome one or more of the problems discussed above.

SUMMARY OF THE INVENTION

A first aspect of the invention is a laser assembly including a removable work table defining a planar work surface. A frame is configured for supporting the removable work table with the work surface in a work surface plane. An X-Y beam transport is operatively associated with the frame and is configured to direct a laser beam from a laser source to X-Y coordinates relative to the frame. At least one clamp is operatively associated between the frame and the removable work table with each clamp having a clamping position for clamping the work table to the frame with the work surface in the work surface plane and a release position for removing the work table from the frame.

Preferably, a first elongate clamp extends along an X axis and a second elongate clamp extends along a Y axis with the clamps being configured for clamping a corresponding edge of the removable work table. A third elongate clamp may be provided extending parallel to the Y axis and spaced from the second elongate clamp, the third elongate clamp being configured to clamp an edge of the removable work table opposite the edge clamped by the second elongate clamp. Measuring indicia is preferably provided on each of the first and second clamps in a substantially fixed orientation relative to the X-Y beam transport with each clamp in the clamping position. Preferably a Z axis control mechanism is provided for moving the frame and the removable work surface table along a Z axis normal to the work surface plane relative to the X-Y beam transport. A void is preferably provided underlying the removable work table, the void being operatively associated with the X-Y beam transport with the removable work table removed. The void is preferably configured to receive a rotary attachment for a work piece. The work table may comprise a planar open cell cutting platform and a planar perforated engraving plate, the planar perforated engraving plate being configured to overlie the planar open cell cutting platform. Alternatively, the work table may consist of only the planar open cell cutting platform.

A second aspect of the present invention is a laser assembly having a removable work table with a planar work surface. A frame is configured for supporting the removable work table with the planar work surface in a work surface plane. An X-Y beam transport is operatively associated with the frame, the X-Y beam transport being configured to direct a laser beam from a laser source to X-Y coordinates relative to the frame. A void underlies the removable work table and is operatively associated with the X-Y beam transport with the removable work surface removed.

A fixture may be provided within the void for supporting a work piece in operative association with the X-Y beam transport. A Z axis control member may be provided for moving the work table along a Z axis normal to the work surface plane between a proximal position near the X-Y beam transport and a distal position away from the X-Y beam transport. A redirectable exhaust having an exhaust operatively associated with the work table for transitioning exhausting above or below the work surface as the work table is moved from the distal position to the proximal position along the Z axis is preferably provided. The redirectable exhaust is preferably configured to exhaust air above the work surface when a work piece is being subjected to an engraving operation and to exhaust air below the work surface when a work piece is being subjected to a cutting operation. The laser assembly preferably further includes upper exhaust inlets operatively associated with the work table to exhaust above the work table regardless of its position along the Z axis. Preferably, the redirectable exhaust exhausts below the work platform when a work piece having less than a first select thickness is operatively associated with the X-Y beam transport and above the work platform when a work piece having greater than a second select thickness is operatively associated with the X-Y beam transport.

A third aspect of the present invention is a laser assembly including a work table having a work surface in a work surface plane. An X-Y beam transport is operatively associated with the work table and the X-Y beam transport is configured to direct a laser beam from a laser beam source to X-Y coordinates on the work surface. The X-Y beam transport is spaced from the work surface plane a variable distance along a Z axis normal to the work surface plane. A Z axis control mechanism is provided for moving the work table along a Z axis normal to the work surface plane relative to the X-Y beam transport between a proximal position near the X-Y beam transport and a distal position away from the X-Y beam transport. A redirectable exhaust has an exhaust inlet operatively associated with the work table for transitioning exhausting above or below the work surface as the work table is moved from the distal position to the proximal position along the Z axis.

The redirectable exhaust is preferably configured to exhaust air above the work surface when a work piece is being subjected to an engraving operation and below the work surface when a work piece is being subjected to a cutting operation. The laser assembly preferably further includes a frame supporting the work table, the frame being operatively associated with the Z axis control for movement along the Z axis. The redirectable exhaust further includes a planar wall wherein the exhaust port is located, a frame exhaust inlet in the frame below the work table and an exhaust tube having a first end attached in fluid communication with the frame inlet and a second end abutting the planar wall. The redirectable exhaust is configured so that the second end of the exhaust tube is in fluid communication with the exhaust port with the work surface in the proximal position and the second end of the exhaust tube is out of fluid communication with the exhaust port with the work surface in the distal position. The exhaust tube is preferably axially rigid and the first end of the exhaust tube is attached to the frame to extend axially from the frame and to move along the Z axis with the frame. A spring is preferably provided biasing the second end of the exhaust tube into abutment with the planar wall. Preferably a bearing is attached to the frame and surrounding the frame inlet, with the bearing slidably receiving the exhaust tube. The exhaust tube further has an annular flange at its second end, the spring being received between the bearing and the annular flange. An exhaust slide plate may be provided on the planar wall with the second end of the exhaust tube contacting the exhaust slide plate. The exhaust tube is preferably made of metal and the exhaust slide plate is preferably made of a low coefficient of friction polymer. Upper exhaust inlets may be provided in operative association with the work table to exhaust above the work table regardless of the position of the work table along the Z axis. The redirectable exhaust preferably exhausts below the work platform when a work piece having less than a first select thickness is operatively associated with the X-Y beam transport and preferably exhausts above the work platform when a work piece having greater than a second select is operatively associated with the X-Y beam transport.

A fourth aspect of the present invention is a method of exhausting fumes from a laser assembly comprising a housing containing an X-Y beam transport and a work table having a work surface, the work table being moveable along the Z axis relative to the X-Y beam transport for engraving or cutting of work pieces of varying dimensions along the Z axis. The method includes placing a work piece on the work surface and adjusting the position of the work table along the Z axis to bring the work piece into operative associate with the X-Y beam transport. Air is automatically selectively exhausted below the work table as a function of the thickness of the work piece along the Z axis. Preferably the air is exhausted below the work table when the work piece has thickness of less than 1.7 inch along the Z axis and air is not exhausted below the work table when the work piece has a thickness of more than 1.7 inch along the Z axis.

The various aspects of the laser assembly of the present invention include a work surface that can be quickly and easily removed yet securely clamped in position. The removable work surface overlying a void facilitates placement of thick items within the void for engraving or installation of a rotary attachment for a work piece. Utilization of the void for these purposes allows the laser assembly to have a lower, more compact profile while still offering features of larger, bulkier assemblies. Clamps provided with measuring indicia have a substantially fixed relationship with respect to the X-Y beam transport which therefore helps assure accurate placement of a work piece on the work table and subsequent highly accurate engraving or cutting. Those aspects including a redirectable exhaust system which "automatically" exhausts fumes and debris from beneath a work piece that is being cut eliminates the risk of not exhausting under work pieces being subject to cutting and thereby promotes uniformly higher quality final products.

DETAILED DESCRIPTION OF THE PREFERRED EMBODIMENT

Figure 1:
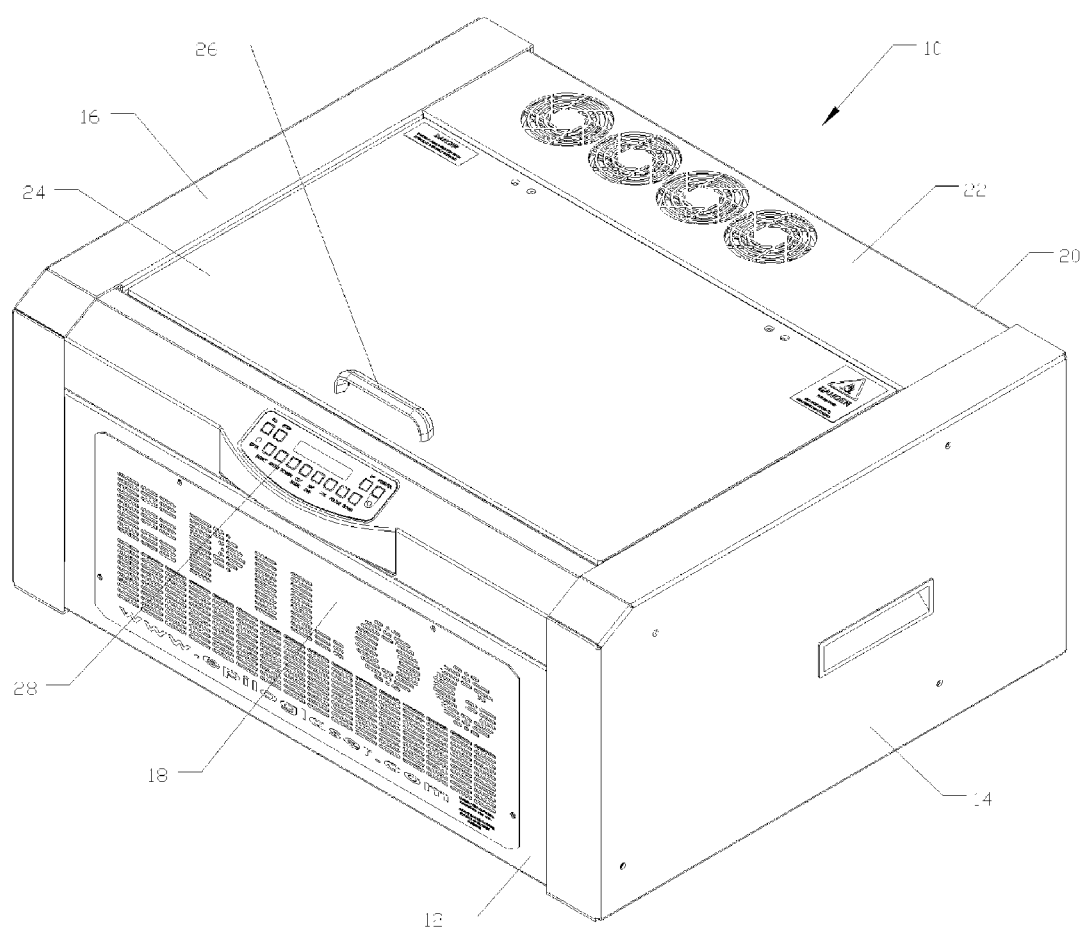
FIG. 1 is a perspective view of a laser assembly in accordance with the present invention.

A laser assembly 10 in accordance with the present invention is shown in perspective view in FIG. 1. The laser assembly 10 includes a housing 12 containing a laser beam source, an X-Y beam transport for directing a laser beam to a work piece, a work surface for supporting the work piece, control electronics, as well as exhaust and ventilation systems, much of which will be described in greater detail below.

The housing includes side panels 14, 16 as well as front and back panels 18, 20. A top surface 22 includes a cover 24 which can be raised by the handle 26 to provide access to a work chamber 27 (see FIG. 2) within the housing 12. The cover 24 is preferably made of a transparent or translucent glass or plastic resistive to damage from laser reflections, for example LEXAN® brand polycarbonate panels from General Electric Company, to enable a user to view or inspect engraving or cutting work being done on a work piece. A control panel 28 is further provided on the top surface 22 of the housing and includes a number of control buttons or switches, along with an LCD display, which provides a user interface to program and control a cutting or engraving process.

Figure 2:
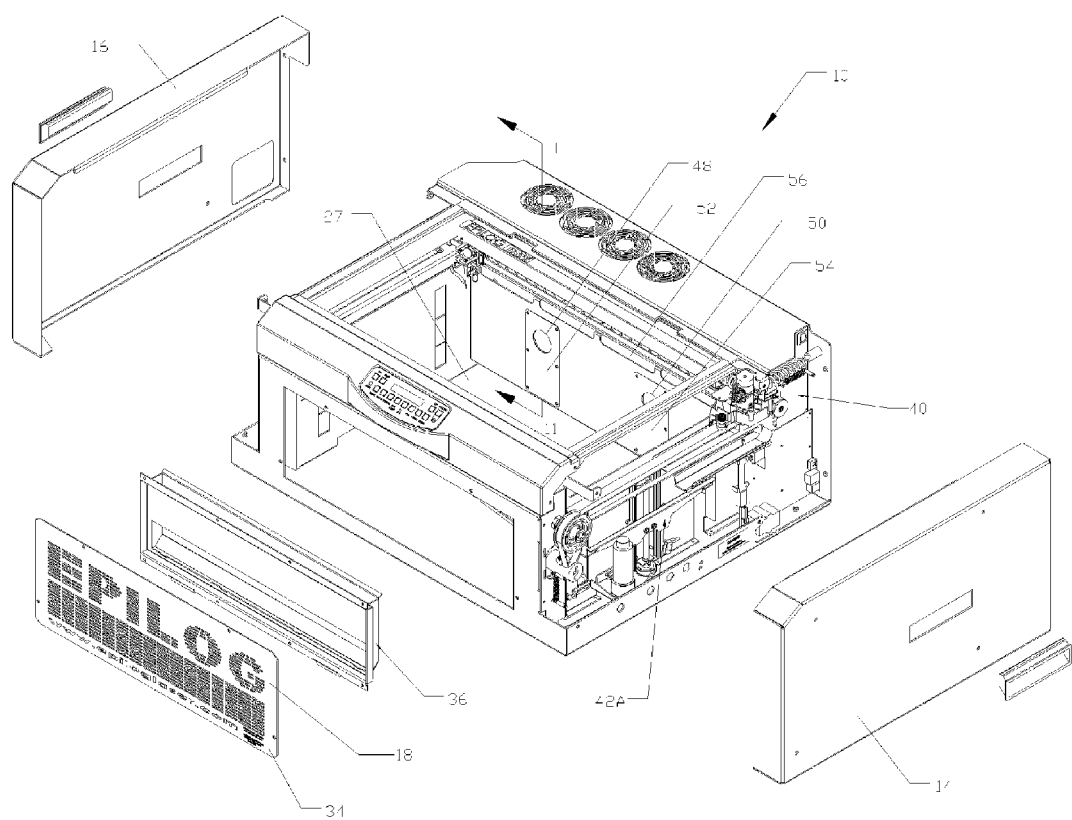
FIG. 2 is a front perspective view of the laser assembly of FIG. 1.

The laser assembly 10 is shown in FIG. 2 with the side panels 14–16 and the front panel 18 exploded and the cover 24 removed. The front panel 18 includes venting slots 34 which cooperate with a baffle weldment 36 to provide air for exhausting the work chamber 27 during a cutting or engraving operation. An X-Y beam transport 40, which will be described in greater detail below, is revealed behind the side panel 14. The X-Y beam transport 40 functions to direct a laser beam generated by a laser beam source to select X-Y coordinates within the work chamber 27. Also residing behind the side panel 14 is a portion of a Z axis control mechanism 42A that receives and controls movement of work table support frame 44 and associated work table 46 (see FIG. 5) along a Z axis normal to a work surface plane of the work table. Also visible in FIG. 2 are exhaust inlets 48, 50 defined in exhaust slider plates 52, 54 which are part of a redirectable exhaust system and upper exhaust inlets 56 which are optionally part of the exhaust system. The slider plates are preferably made of a low-friction polymer such as DELRIN® acetyl.

Figure 3:
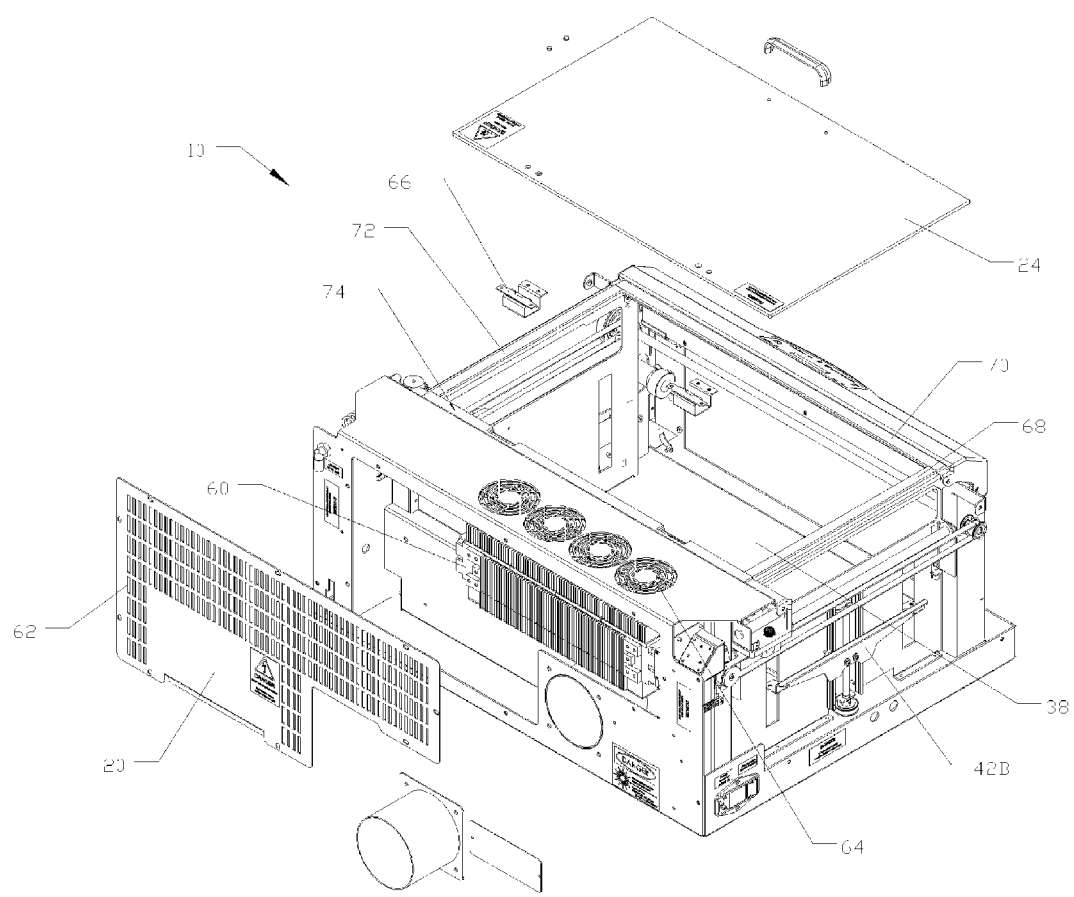
FIG. 3 is a partially exploded view of the housing of the laser assembly of FIG. 1.

The laser assembly 10 is shown from the rear in FIG. 3 with the side panels 14, 16 removed and the back panel 20 exploded from the housing 12. Removal of the back panel 64 reveals the laser beam source 60 which is cooled by air drawn through the ventilation slots 62 by cooling fans (not shown) which exhaust through the vents 62. Viewed behind the removed side panel 16 is a second part of the Z axis control mechanism 42B which cooperates with the first part of the Z axis control mechanism 42A to position the work table as desired along the Z axis relative to the X-Y beam transport. The cover 24 is mounted to the top surface 22 of the housing by hinges 66 to allow convenient access to the work chamber 27. Gaskets 68, 70, 72, 74 are provided along cover supports within the housing for substantially sealing the cover 24 to the housing top when the cover 24 is closed.

Figure 4:
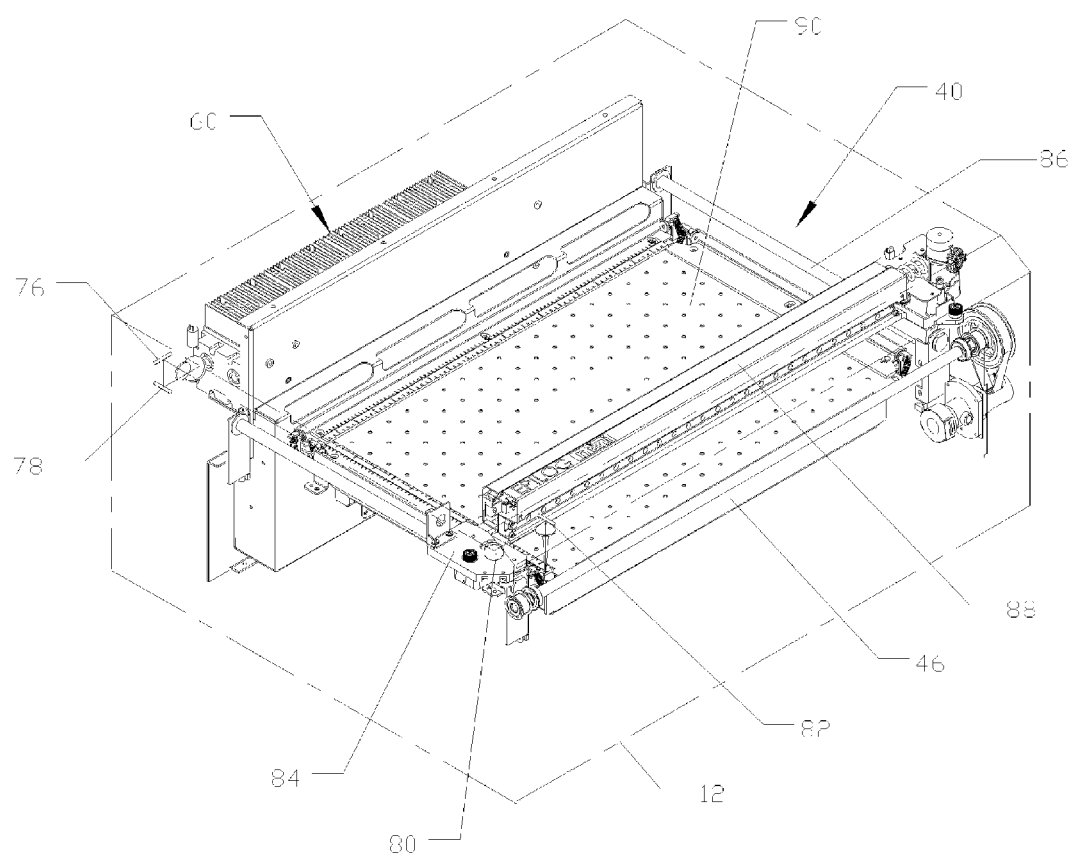
FIG. 4 is perspective view of an X-Y beam transport in operative association with a work table of the laser assembly of FIG. 1 with the housing in phantom lines.

FIG. 4 reveals the X-Y beam transport 40 in greater detail. The housing 12 is illustrated in phantom lines and most of the other elements of the laser assembly 10 are removed for the sake of clarity. X-Y beam transports are well known in the art and the precise configuration of the X-Y beam transport is not critical to the invention claimed herein. The essential features to the X-Y beam transport are a number of mirrors such as the upper steering mirror 76, the lower steering mirror 78, the Y axis mirror 80 and the X axis mirror 82 that cooperate to direct a laser beam generated by the laser beam source 60 through controlled movement of the Y carriages 84, 86 and the X carriage 88, to select X-Y coordinates in the work chamber 27, more particularly, on a work surface 90 of the work table 46. One exemplary X-Y beam transport is described in greater detail in Garnier, U.S. Pat. No. 4,985,780.

Figure 5:
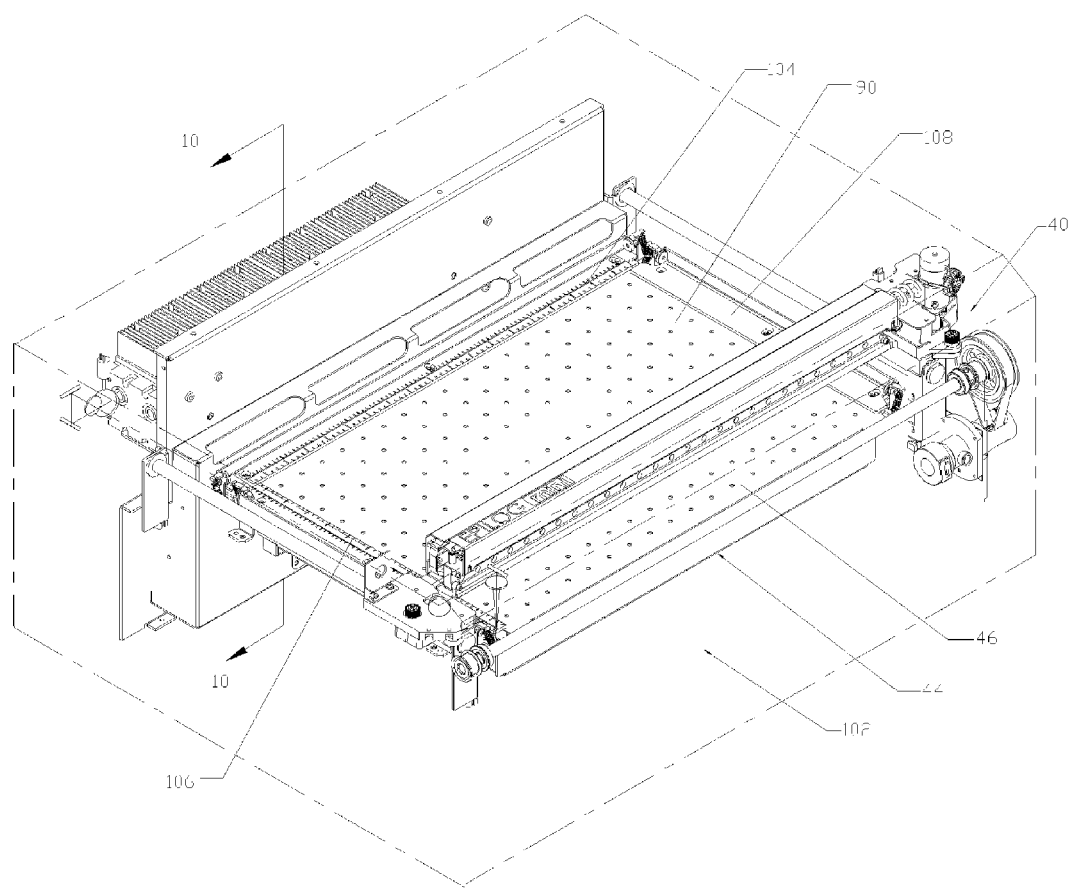
FIG. 5 is a perspective view of the laser assembly of FIG. 1 with frame supporting the work surface over an underlying void and the housing in phantom lines.

Referring to FIG. 5, the work table 46 is supported by frame 44 with the work surface 90 in a work surface plane which is parallel to a plane of operation of the X-Y beam transport 40. The frame 44 supports the work table 46 over a void 102 which underlies the work table 46, with the work table deployed as illustrated in FIG. 5. The work table 46 is secured to the frame 44 by a first clamp 104 along an X axis and a second clamp 106 along a Y axis. Preferably a third clamp 108 is provided spaced from the second clamp parallel to the Y axis. These clamps will be discussed in greater detail with reference to FIGS. 7–9. As discussed above, the support frame 44 is attached to the Z axis control mechanism so that it can be raised or lowered into "operative association" with the X-Y beam transport 40. In this context, "operatively associated" or "operative association" means positioned relative to the X-Y beam transport that a laser beam produced thereby can be focused onto a work piece resting on the work table supported by the frame to cut or engrave the work piece.

Figure 6:
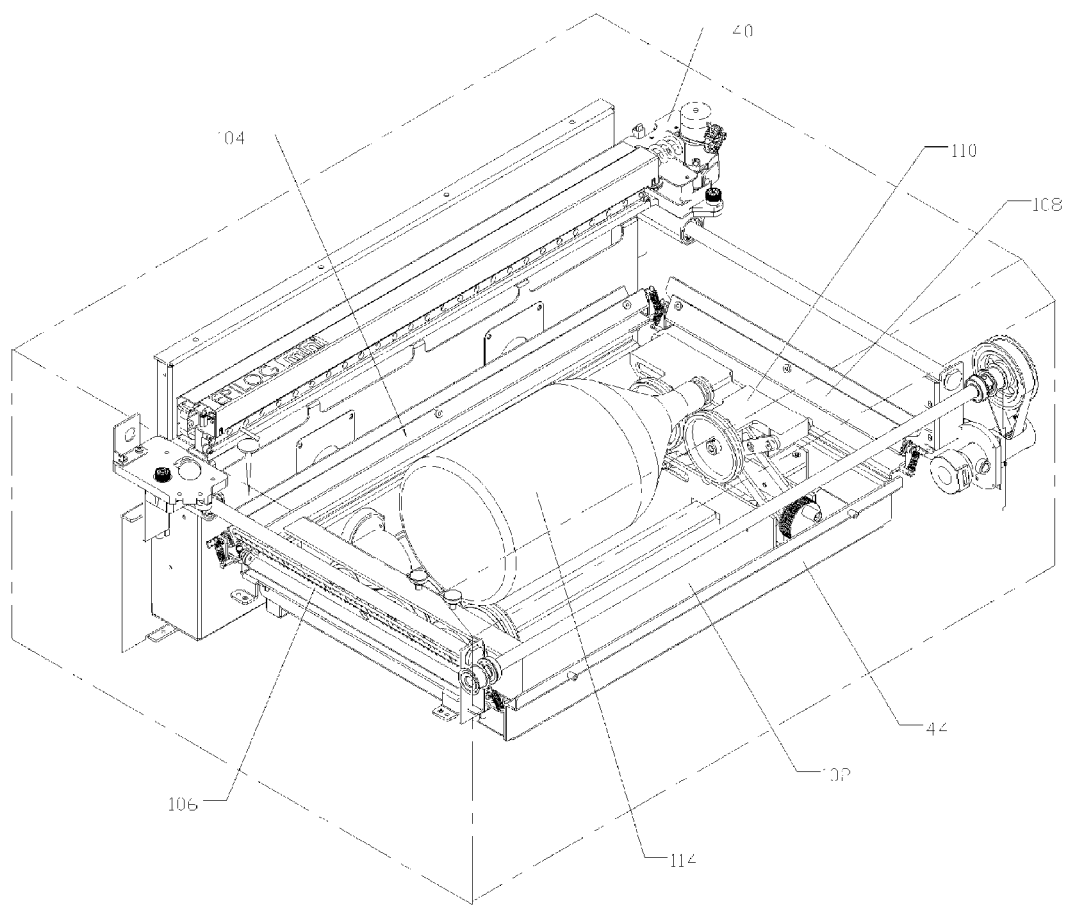
FIG. 6 is a perspective view of the laser assembly of FIG. 5 with the work table removed and a rotary attachment disposed in the underlying void.

FIG. 6 illustrates the work table 46 removed from the frame 44 with the first, second and third clamps 104, 106, 108 open allowing the X-Y beam transport 40 to be in operative association with a work piece within the void 102. A rotary attachment fixture 110 is deployed in the void 102 attached to the void bottom. The rotary attachment fixture 110 supports a work piece 114 for laser engraving by the X-Y beam transport 40. Alternatively, a large three-dimensional item could rest on the void bottom for engraving by the X-Y beam transport 40.

Figure 7:
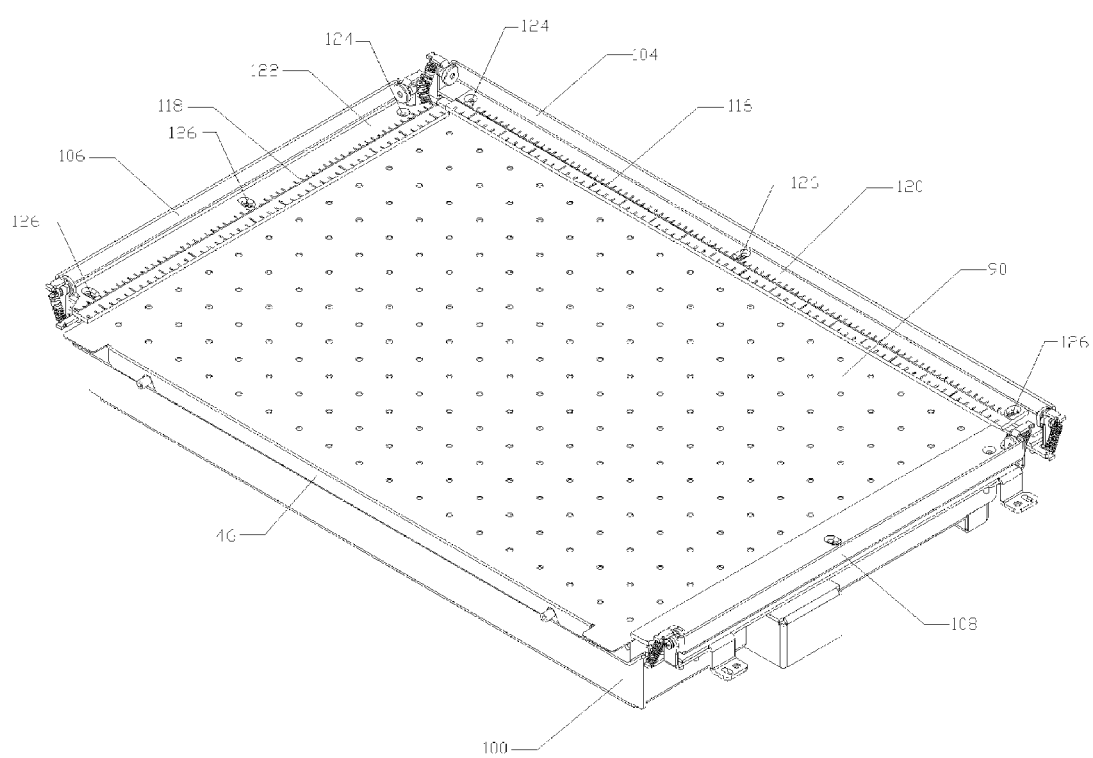
FIG. 7 is a perspective view of the frame for supporting the removable work table with the removable work table clamped thereto of the laser assembly of FIG. 1.
Figure 8:
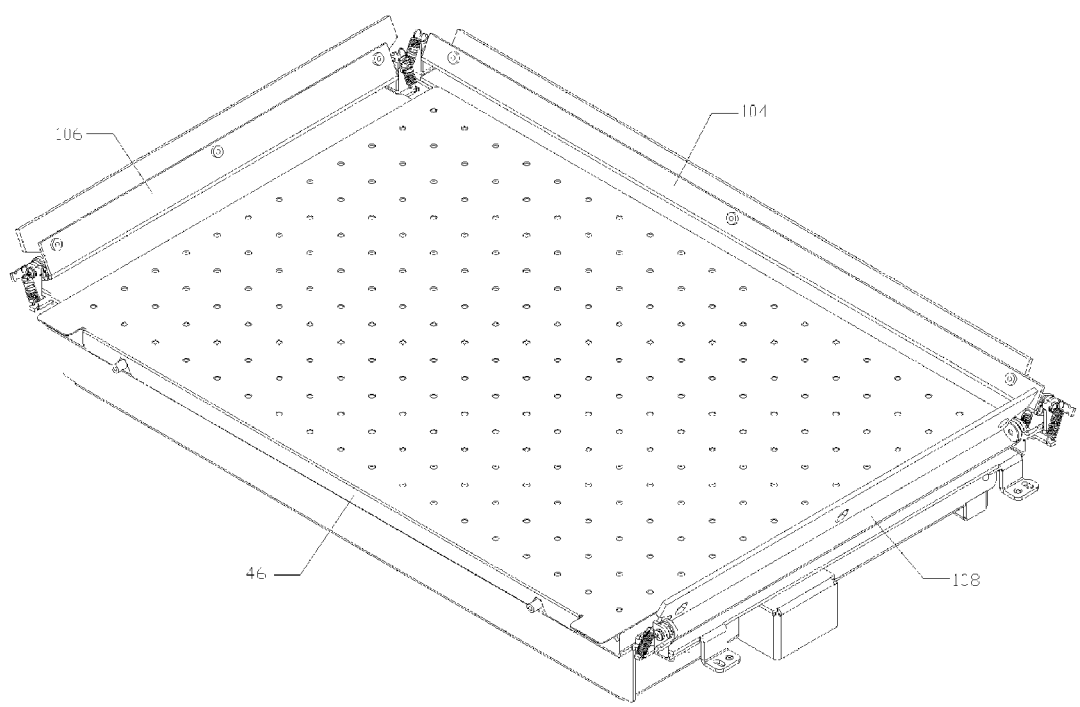
FIG. 8 is a perspective view of the frame for supporting the removable work table of the laser assembly of FIG. 1 with the clamps in a release position.

The frame 44 for supporting the work table 46 is shown removed from the laser assembly in FIG. 7. The first, second and third clamps 104, 106, 108 are shown in a clamping position securing an X edge and the Y edges of the work table to the frame 44. Clearly seen in FIG. 7 are measuring indicia 116, 118 on the first clamp 104 and the second clamp 106. The measuring indicia 116, 118 are provided on elongate plates 120, 122 which are fastened to the first and second clamps 104, 106, respectively. Each of the elongate plates 120, 122 has a circular hole 124 and elongate slots 126 which allow the elongate plates to be attached to the clamps 104, 106 and then aligned to assure they are parallel to the axes of movement of the X-Y beam transport. Each of the first, second and third clamps 104, 106, 108 are pivotally connected to the frame 44 to pivot between a clamping position securing the work table 46 to the frame 44 and a release position for removing the work table from the frame, which is illustrated in FIG. 8. The frame 44 is in turn attached to the Z axis control mechanisms 42A, 42B which are in turn secured to the housing 12. In this manner, the frame 44 is fixed in the X-Y directions relative to the housing and relative to the X-Y beam transport 40. Further, the indicia 116, 118 are fixed in the X-Y directions relative to the X-Y beam transport. This enables a user to position a work piece on the work surface 90 of the work table 46 in a precise position allowing for highly accurate engraving and cutting by the X-Y beam transport 40 on the work piece.

Figure 9:
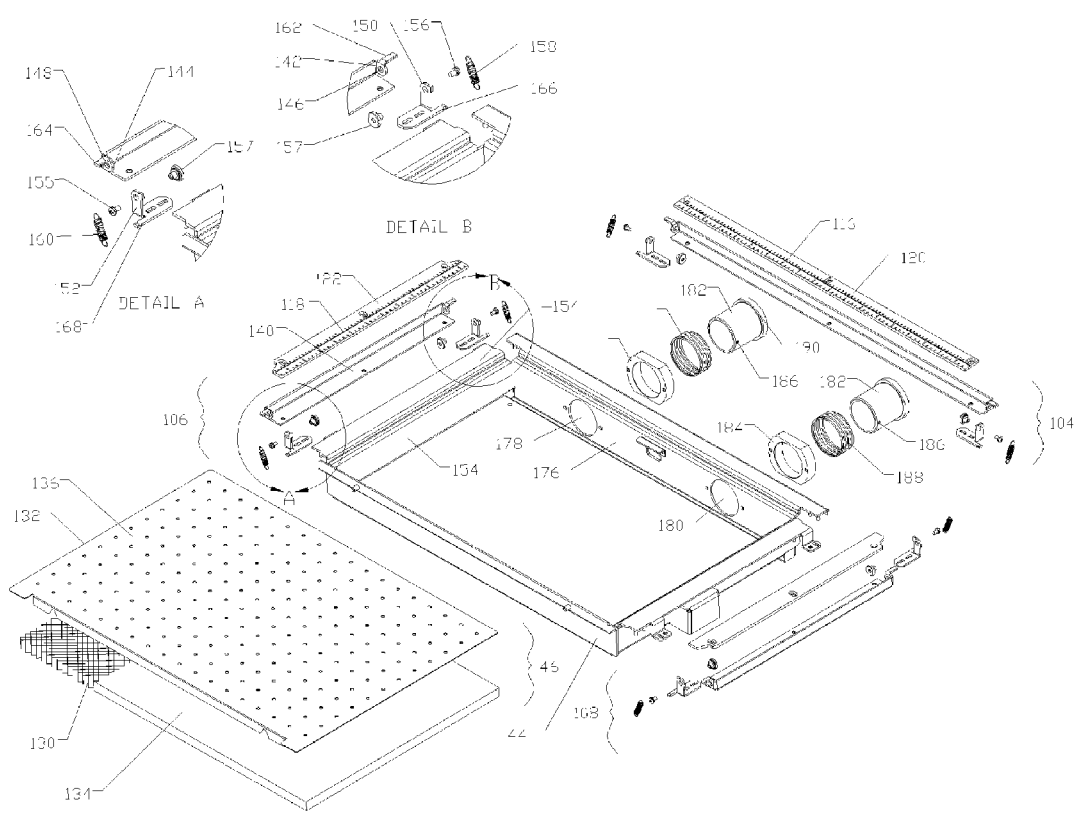
FIG. 9 is an exploded view of the frame for supporting the removable work table of FIG. 7.

FIG. 9 shows the frame 44 and work table 46 assemblies in an exploded view. The work table 46 shown in FIGS. 7–8 includes a planar open cell cutting platform 130 and a planar perforated engraving plate 132. The planar open cell cutting platform 130 defines a cutting platform planar surface 134 and the planar perforated engraving plate defines engraving plate surface 136. The planar perforated engraving plate 132 is configured to nest above the planar open cell cutting platform 130 when a work piece is to reside on the engraving surface 136. Alternatively, the planar perforated engraving plate 132 can be removed when a work piece is to be cut and therefore it is desirable to rest the work piece upon the cutting platform planar surface 134. The planar perforated engraving plate 132 is sufficiently thin that the measuring indicia 116, 118 on the first and second clamps 104, 106 is substantially in the same position relative to the surface of the work table whether the work piece rests upon the planar perforated engraving plate 132 or the planar perforated engraving plate 132 is removed and the work piece rests directly on the planar open cell cutting platform 130 and the clamps engage the planar open cell cutting platform 130. "Substantially in the same position" means any variation in the position of the indicia relative to the X-Y beam transport is within the laser apparatus tolerances.

The first, second and third clamps 104, 106, 108 comprise substantially identical assemblies that will be described in detail only with respect to the second clamp 106. An elongate clamp plate 140 has end flanges 142, 144 having holes 146, 148. The elongate clamp plate 140 is secured to the frame 44 by brackets 150, 152 that are bolted to a frame flange 154. Pins 155, 156 are received through holes in the brackets 150, 152 and the holes 146, 148 in the end flanges 142, 144 of the elongate clamp plate and secured in position by studs 157. Coil springs 158, 160 engage tabs 162, 164 extending from the flanges of the elongate clamp plate 140 and tabs 166, 168 on the brackets 150, 152 to bias the clamp 106 in the clamping position once the clamp 106 pivots over center from the release position. In this manner the clamps 104, 106, 108 securely hold the work table 46 in position relative to the frame 44.

Provided in a back wall 176 of the frame 44 are a pair of frame inlets 178, 180 that form part of a redirectable exhaust for the laser assembly and which are selectively in fluid communication with the exhaust inlets 48, 50. The fluid communication is provided by exhaust tubes 182 that are slidably associated with the frame inlets 178, 180 by axial receipt through the bearing 184 which are secured to the back of a frame about the frame inlets 178, 180. Pins (not shown) are provided in the distal holes 186 of the exhaust tubes 182 to secure the exhaust tubes in place within the frame inlets 178, 180. A spring 188 axially receives the exhaust tubes and is positioned between the bearings 184 and an annular flange 190 and serves to bias the exhaust tube 182 in an extended position relative to the frame 44 for reasons which will be clear with reference to FIGS. 10A–10C. The exhaust tube 182 is preferably made of a rigid material such as PVC or metal.

Figure 10A:
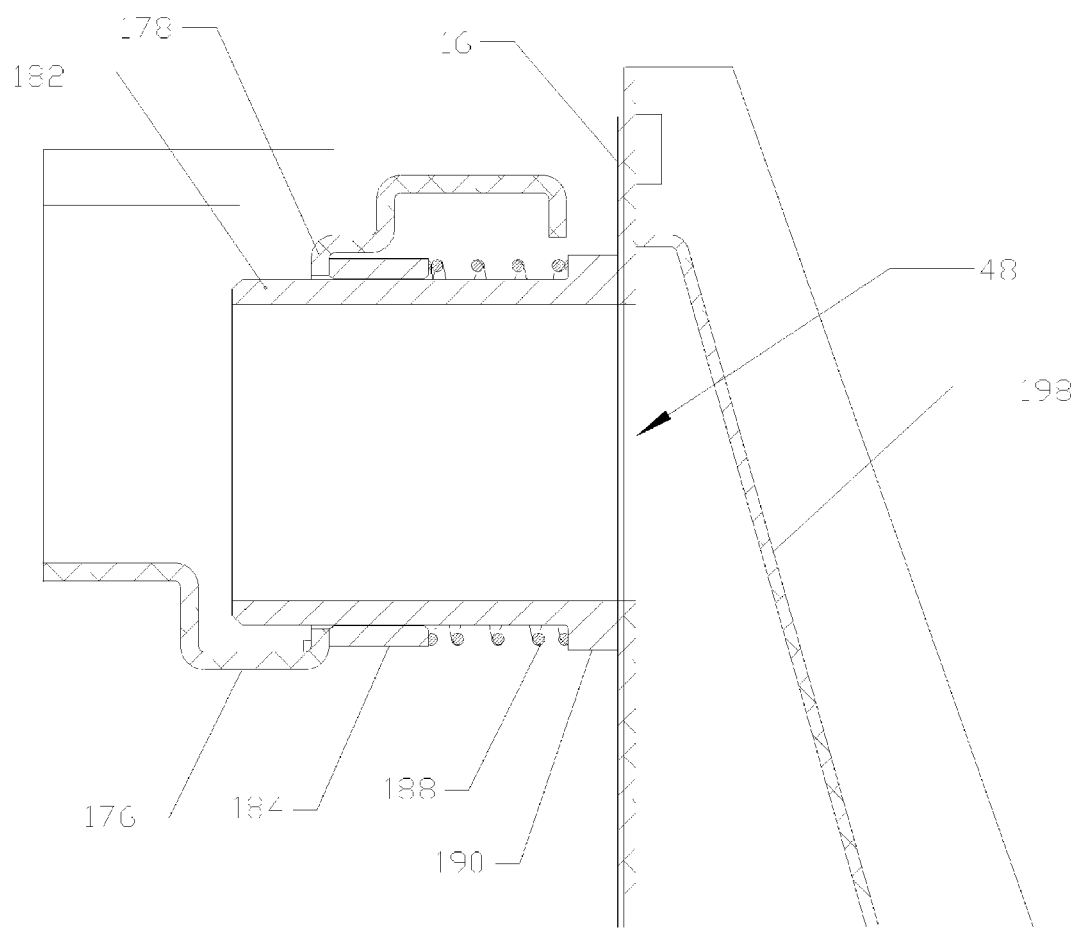
FIGS. 10A–C are cross-sectional views taken along lines 10—10 of FIG. 5 illustrating an automatically redirected exhaust path.

FIG. 10A shows the exhaust tube 182 operatively associated between the frame inlet 178 and the exhaust inlet 48. The annular flange 190 abuts the slide panel 16 and is biased into abutment by the spring 188. As discussed earlier, the frame 44 is movable on the Z axis by the Z axis control mechanism. The exhaust inlet 48 and the slide plate 16, however, are fixed along the Z axis relative to the frame 44. With the frame 44 and thus the work table 46 in a fully proximal position (that is fully extended and closest to the X-Y beam transport) the exhaust tube is in full fluid communication with the exhaust inlet 48 as illustrated in FIG. 10A. This would be the position of the work table when a thin work piece resting on the cutting platform planar surface 134 is being cut. The annular flange 190 maintains this essentially full fluid communication as the frame is lowered somewhat for cutting pieces up to a first select thickness, (e.g., 0.25–0.5 inch thickness along the Z axis). With the exhaust tube 182 thus engaged, air is drawn from the vent slots 34 in the front panel 18 of the housing under the planar open cell cutting platform defining the work table and thus fumes and debris resulting from the cutting operation are evacuated or exhausted from under the work table. In addition, the exhaust creates a negative pressure that helps adhere work pieces to the cutting platform planar surface 134. This adhesion can be particularly useful when thin, flexible work pieces such as gaskets are being cut.

Figure 10B:
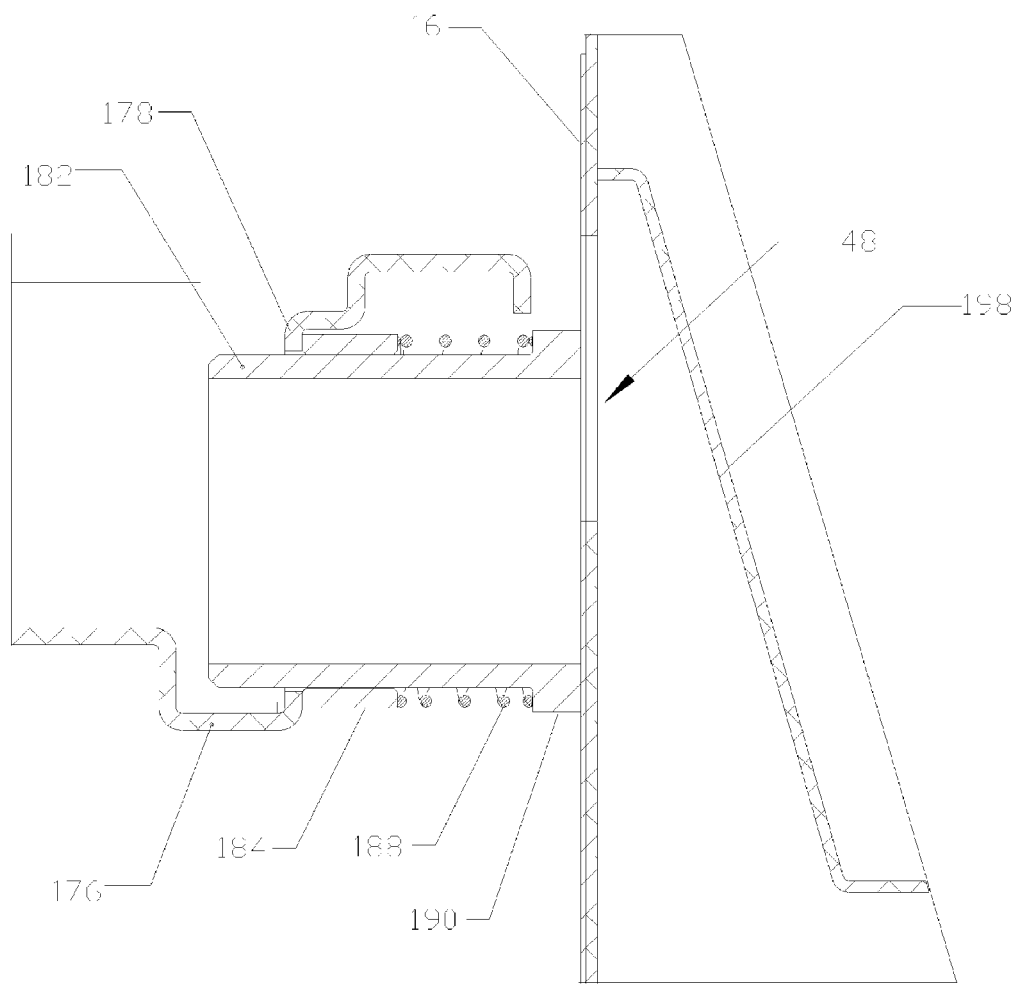
Figure 10C:
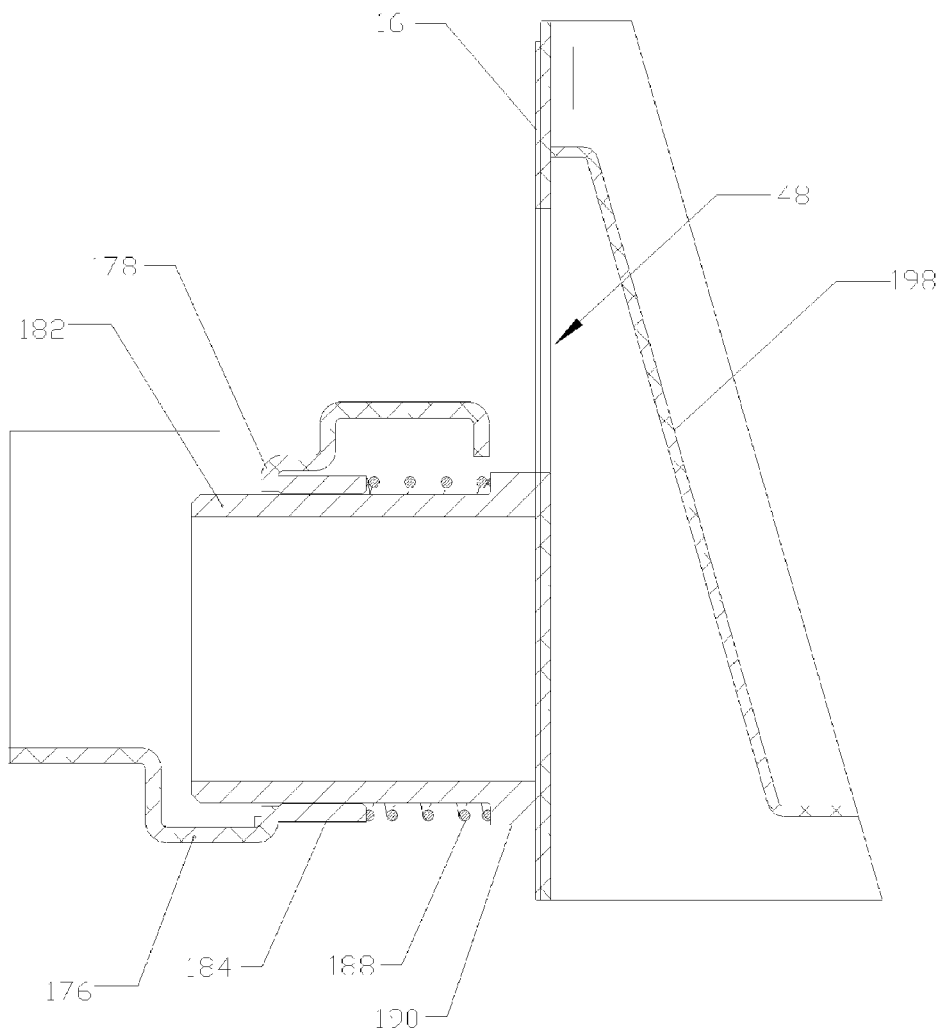

When thicker pieces exceeding the cutting capacity of the laser assembly are to be engraved, the frame and work table are lowered relative to the X-Y beam transport and thus the exhaust tube is lowered relative to the exhaust inlet 48 as illustrated in FIG. 10B. As a result, the amount of exhausting below the work piece diminishes. With a work piece having greater than a select thickness, e.g., 2.0 inch, the exhaust tube 182 is no longer in any fluid communication with the exhaust inlet 48 and as a result all exhausting is occurring above the work surface of the work table, as illustrated in FIG. 10C.

Figure 11:
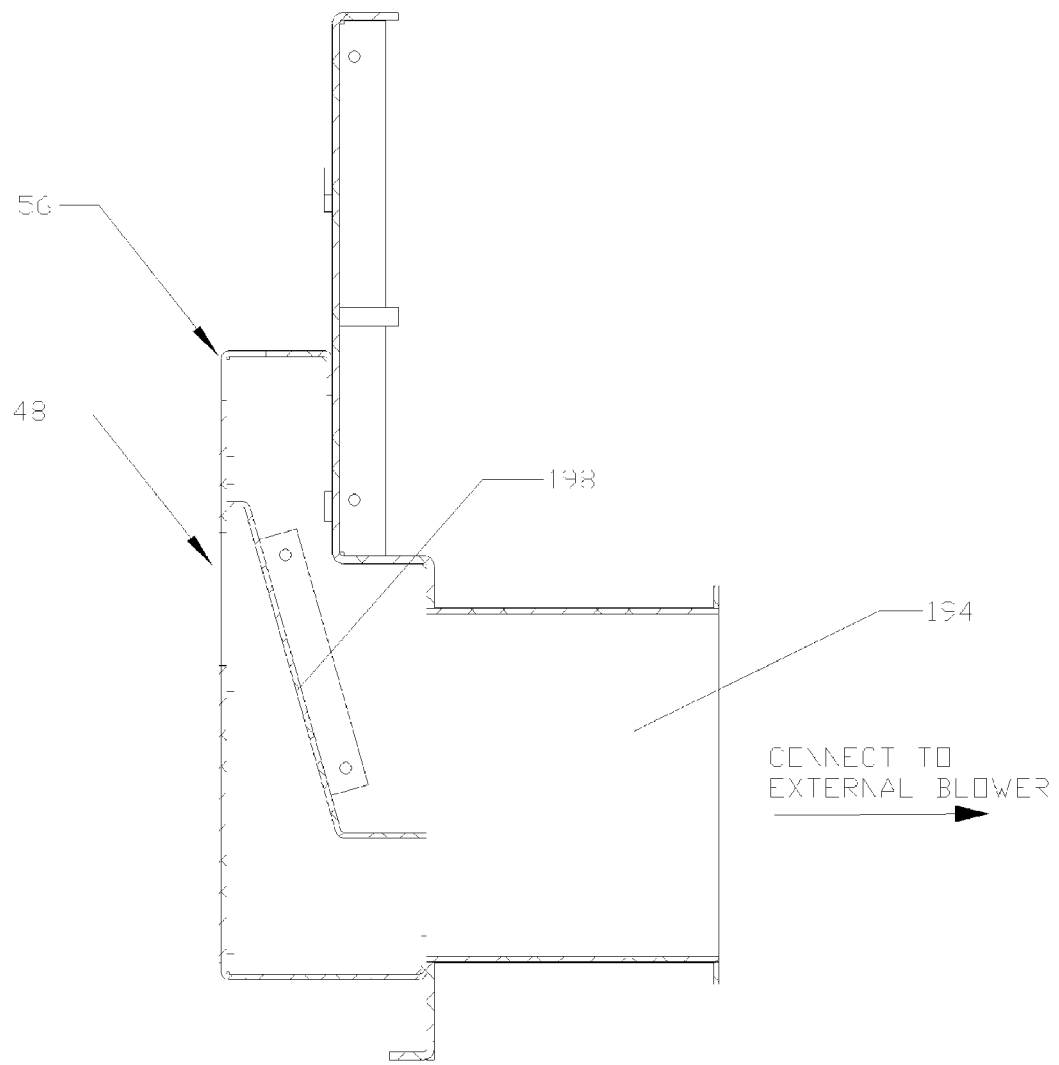
FIG. 11 is a cross-sectional view taken along line 11—11 of FIG. 2 illustrating the exhaust plenum and baffle system of the laser assembly of FIG. 1.

Referring back to FIG. 2, upper exhaust inlets 56 are preferably provided for providing constant exhaust above the work table 46 regardless of the position of the work table 46 along the Z axis. Referring to FIG. 11, in such an embodiment the exhaust system includes a plenum 194 which is in fluid communication with both the upper exhaust inlet 56 and the exhaust inlets 48, 50. This plenum is in turn in fluid communication with a fan (not shown) which drives the exhaust through the work chamber 27. A baffle 198 is configured so that about 60% of the exhaust flows through the upper exhaust inlets 56 and approximately 40% of the exhaust flows through the exhaust inlet 48, 50.

EXAMPLE

In an exemplary embodiment, a low profile laser assembly housing 12 is configured to have external dimensions as follows: Height 12.7 inches, width 27.8 inches, depth 22.4 inches. The X-Y beam transport 40 can direct the laser beam over an area of 18 inches in the X-dimension and 12 inches in the Y-dimension. The Z axis control mechanism can move the work surface 4 inches in the Z-dimension. The void underlying the work table 46 is 2 inches deep. The exhaust is configured so that upon cutting/engraving work pieces of between 0–0.4 inches thick, the redirectable exhaust exhausts exclusively below the work table. In other words, the exhaust inlets 48, 50 are fully mated with the annular flanges 190. That is, no portion of the area of the exhaust inlets 48, 50 will be exposed to exhaust air from the housing interior. For work pieces between 0.4–1.7 inches in thickness, the exhaust inlets 48, 50 will be partially uncovered and some portion of air will be exhausted below the work table and some will be exhausted above the work table, as illustrated in FIG. 10B. For work pieces greater than 1.7 inches in thickness, exhaust will be cut-off below the table as illustrated in FIG. 10C.

What is claimed is:

1. A laser assembly comprising:
    a removable work table defining a planar work surface;
    a frame configured for supporting the removable work table with the work surface in a work surface plane;
    an X-Y beam transport operatively associated with the frame, the X-Y beam transport being configured to direct a laser beam from a laser beam source to X-Y coordinates relative to the frame; and
    at least one clamp operatively associated between the frame and the removable work table having a clamping position for clamping the work table to the frame with the work surface in the work surface plane and a release position for removing the work table from the frame.

2. The laser assembly of claim 1 further comprising a first elongate clamp extending along the X axis and a second elongate clamp extending along the Y axis, the clamps being configured for clamping a corresponding edge of the removable work table.

3. The laser assembly of claim 2 further comprising a third elongate clamp extending parallel to the Y axis spaced from the second elongate clamp, the third elongate clamp being configured to clamp an edge of the removable work table opposite the edge clamped by the second elongate clamp.

4. The laser assembly of claim 2 further comprising measuring indicia on each of the first and second clamps in a substantially fixed orientation relative to the X-Y beam transport with each clamp in the clamping position.

5. The laser assembly of claim 1 further comprising a Z axis control mechanism operatively associated with the frame for moving the frame along a Z axis normal to the work surface plane relative to the X-Y beam transport.

6. The laser assembly of claim 1 further comprising a void underlying the removable work table, the void being operatively associated with the X-Y beam transport with the removable work table removed.

7. The laser assembly of claim 6 wherein the void is configured to receive a rotary attachment for a work piece.

8. The laser assembly of claim 1 wherein the removable work table comprises a planar open cell cutting platform and a planar perforated engraving plate, the planar perforated engraving plate being configured to overly the planar open cell cutting platform.

9. The laser assembly of claim 1 wherein the removable work table comprises a planar open cell cutting platform.

10. A laser assembly comprising:
a removable work table having a planar work surface;
a frame configured for supporting the removable work table with the planar work surface in a work surface plane;
an X-Y beam transport operatively associated with the frame, the X-Y beam transport being configured to direct a laser beam from a laser beam source to X-Y coordinates relative to the frame; and
a void underlying the removable work table, the void being operatively associated with the X-Y beam transport with the removable work surface removed.

11. The laser assembly of claim 10 further comprising a fixture within the void for supporting a work piece in operative association with the X-Y beam transport.

12. The laser assembly of claim 10 further comprising:
a Z axis control mechanism for moving the work table along a Z axis normal to the work surface plane relative to the X-Y beam transport between a proximal position near the X-Y beam transport and a distal position away from the X-Y beam transport; and
a redirectable exhaust having an exhaust inlet operatively associated with the work table for transitioning exhausting above or below the work surface as the work table is moved from the distal position to the proximal position along the Z axis.

13. The laser assembly of claim 10 wherein the redirectable exhaust is configured to exhaust air above the work surface when a work piece is being subjected to an engraving operation and below the work surface when a work piece is being subject to a cutting operation.

14. The laser assembly of claim 10 further comprising upper exhaust inlets operatively associated with the work table to exhaust above the work table regardless of its position along the Z axis.

15. The laser assembly of claim 10 wherein the redirectable exhaust exhausts below the work platform when a work piece having less than a first select a thickness is operatively associated with the X-Y beam transport and above the work platform when a work piece having greater than a second select thickness is operatively associated with the X-Y beam transport.

16. A laser assembly comprising:
a work table having a work surface in a work surface plane;
an X-Y beam transport operatively associated with the work table, the X-Y beam transport being configured to direct a laser beam from a laser beam source to X-Y coordinates, the X-Y beam transport being spaced from the work surface plane a variable distance along a Z axis normal to the work surface plane;
a Z axis control mechanism for moving the work table along a Z axis normal to the plane work surface relative to the X-Y beam transport between a proximal position near the X-Y beam transport and a distal position away from the X-Y beam transport;
a redirectable exhaust having an exhaust inlet operatively associated with the work table for transitioning exhausting above or below the work surface as the work table is moved from the distal position to the proximal position along the Z axis.

17. The laser assembly of claim 16 wherein the redirectable exhaust is configured to exhaust air above the work surface when a work piece is being subjected to an engraving operation and below the work surface when a work piece is being subject to a cutting operation.

18. The laser assembly of claim 16 further comprising a frame supporting the work table, the frame being operatively associated with the Z axis control for movement along the Z axis and the redirectable exhaust further comprises a planar wall wherein the exhaust inlet is located and fixed along the Z axis, a frame inlet in the frame below the work table and an exhaust tube having a first end attached in fluid communication with the frame inlet and a second end abutting the planar wall, the redirectable exhaust being configured so that the second end of the exhaust tube is in fluid communication with the exhaust port with the work surface in the proximal position and out of fluid communication with the exhaust port with the work surface in the distal position.

19. The laser assembly of claim 18 wherein the exhaust tube is axially rigid and the first end of the exhaust tube is attached to the frame to extend axially from the frame and to move along the Z axis with the frame.

20. The laser assembly of claim 19 further comprising a spring biasing the second end of the exhaust tube into abutment with the planar wall.

21. The laser assembly of claim 20 further comprising a bearing attached to the frame and surrounding the frame inlet slidably receiving the exhaust tube, the redirectable exhaust tube further having an annular flange at its second end, the spring being received between the bearing and the annular flange.

22. The laser assembly of claim 21 further comprising an exhaust slide plate on the planar wall with the exhaust inlet defined in the exhaust slide plate, the second end of the exhaust tube contacting the exhaust slide plate.

23. The laser assembly of claim 21 wherein the exhaust tube is made of metal and the exhaust slide plate is made of a low coefficient of friction polymer.

24. The laser assembly of claim 16 further comprising upper exhaust inlets operatively associated with the work table to exhaust above the work table regardless of its position along the Z axis.

25. The laser assembly of claim 16 wherein the redirectable exhaust exhausts below the work platform when a work piece having less than a first select thickness is operatively associated with the X-Y beam transport and above the work platform when a work piece having greater than a second select thickness is operatively associated with the X-Y beam transport.

26. The laser assembly of claim 16 further comprising a frame configured for supporting the work table with the work surface in the work surface plane defined by X-Y axes, the work table being releasably attached to the frame.

27. The laser assembly of claim 26 further comprising a void underlying the work table, the void being operatively associated with the X-Y beam transport with the planar work surface removed from the frame.

28. A method of exhausting fumes from a laser assembly comprising a housing containing an X-Y beam transport in operative association with a laser beam source and a work table having a work surface, the work table being movable along a Z axis relative to the X-Y beam transport for engraving or cutting of work pieces of varying dimensions along the Z axis, the method comprising:
   placing a work piece on the work surface;
   adjusting the position of the work table along the Z axis to bring the work piece into operative association with the X-Y beam transport; and
   automatically selectively exhausting air below the work table as a function of the thickness of the work piece along the Z axis.

29. The method of claim 28 further comprising automatically selectively exhausting air below the work table when the work piece has a thickness of less than 1.7 inch along the Z axis.

30. The method of claim 28 further comprising automatically selectively not exhausting air below the work table when the work piece has a thickness of more than 1.7 inch along the Z axis.

* * * * *